United States Patent [19]

Carter et al.

[11] Patent Number: 5,628,933
[45] Date of Patent: May 13, 1997

[54] TRANSPARENT CONDUCTORS COMPRISING ZINC-INDIUM-OXIDE AND METHODS FOR MAKING FILMS

[75] Inventors: Sue A. Carter, Basking Ridge; Robert J. Cava, Bridgewater; Jueinai R. Kwo, Watchung; Julia M. Phillips, Mountainside; Gordon A. Thomas, Princeton, all of N.J.

[73] Assignee: Lucent Technologies Inc., Murray Hill, N.J.

[21] Appl. No.: 622,324

[22] Filed: Mar. 26, 1996

Related U.S. Application Data

[63] Continuation of Ser. No. 335,615, Nov. 8, 1994, abandoned, which is a continuation-in-part of Ser. No. 322,902, Oct. 13, 1994, abandoned.

[51] Int. Cl.$^6$ .................... H01B 1/08; C01G 15/00; C01G 9/02
[52] U.S. Cl. .................... 252/518; 252/520; 252/521; 420/514; 420/524; 420/555; 420/903; 423/99; 423/115
[58] Field of Search .................... 252/518, 520, 252/521; 420/514, 524, 555, 903; 423/99, 115

[56] References Cited

U.S. PATENT DOCUMENTS

| | | | |
|---|---|---|---|
| 4,172,922 | 10/1979 | Merz | 428/432 |
| 4,416,963 | 11/1983 | Takimoto | 430/69 |
| 4,736,183 | 4/1988 | Yamazaki | 338/20 |
| 4,990,286 | 2/1991 | Gordon | 252/518 |
| 5,196,102 | 3/1993 | Kumar | 427/528 |

FOREIGN PATENT DOCUMENTS 234521  8/1994  Japan.

*Primary Examiner*—D. R. Wilson
*Attorney, Agent, or Firm*—Eugen E. Pacher; Glen E. Books

[57] ABSTRACT

Applicant has discovered that aliovalently doped zinc-indium-oxide where In is 40–75% of the metal elements can achieve electrical conductivity comparable to wide band-gap semiconductors presently in use while exhibiting enhanced transparency in both the visible and infrared. The material can be doped to resistivity of less than 1 milliohm-cm by small quantifies of aliovalent dopants, such as tetravalent atoms. It can be deposited on glass substrates in amorphous and polycrystalline films.

11 Claims, 2 Drawing Sheets

6,628,933

TRANSPARENT CONDUCTORS COMPRISING ZINC-INDIUM-OXIDE AND METHODS FOR MAKING FILMS

CROSS-REFERENCE TO RELATED APPLICATION

This application is a continuation of U.S. patent application Ser. No. 08/335,615, filed on Nov. 8, 1994, now abandoned, which is a continuation-in-part of U.S. patent application Ser. No. 08/322,902, filed Oct. 13, 1994, now abandoned.

FIELD OF THE INVENTION

This invention relates to conducting materials and, in particular, to conducting materials comprising zinc-indium-oxide, where In is 40–75 atomic % of the metal elements. These materials, especially when doped with aliovalent dopants, exhibit electrical conductivity in a transparent state.

BACKGROUND OF THE INVENTION

Only a handful of materials provide the highly useful combination of electrical conduction and optical transparency. The earliest used materials were thin films of gold, silver and platinum used as electrodes on photoelectric cells. Wide band-gap semiconductor transparent electrodes including tin oxide coatings came into use during World War II (Nesa glass), and indium oxide coatings became commercially available in the 1970's. See G. Haacke, "Transparent Conducting Coatings", 7 Ann. Rev. Mater. Sci. 73–93 (1977).

Transparent conductive materials are important components in visual communications devices and useful in a variety of other applications. In modern liquid crystal displays, for example, arrays of transparent electrodes define the display segments or even pixels to be activated. Moreover transparent conductors can be used as antistatic coatings on instrument panels, heating elements on aircraft windows, and electrodes on solar cells. Such materials are also useful as heat retaining and ultraviolet light-rejecting coatings on windows.

One difficulty with presently available transparent conductive materials is their narrow transmission spectrum. They tend to absorb blue light in the visible spectrum and some tend even to absorb red light. For example, indium tin oxide, widely used because of its high conductivity, tends to absorb blue light and, as a consequence, appears yellow or green. Such absorption requires higher power levels, limits choice in coloration, and presents an impediment to the development of full color flat panel displays. Presently known transparent conducting materials are absorbing in the infrared portion of the electromagnetic spectrum. Conducting materials that are transparent in the infrared can also to be useful for devices emitting at these wavelengths, for example, surface-emitting lasers operating at 980 nm, 1.3 µm or 1.5 µm.

SUMMARY OF THE INVENTION

Applicant has discovered that zinc-indium-oxide where In is 40–75 atomic % of the metal elements is a transparent conductive material and, when aliovalently doped, it can achieve electrical conductivity comparable to wide bandgap semiconductors presently in use while exhibiting enhanced transparency. The material can be doped to resistivity of less than 600 micro ohm-cm by small quantities of aliovalent dopants, such as tetravalent atoms. It is transparent in the visible and a significant part of the infrared spectrum.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

Figure 1:
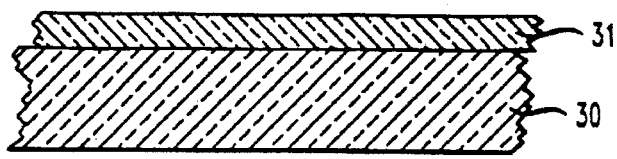
FIG. 1 is a schematic cross section of a substrate coated with conductively doped zinc-indium-oxide.

It is to be understood that these drawings are for purposes of illustrating the concepts of the invention and, except for the graphs, are not to scale.

DETAILED DESCRIPTION

Applicants have discovered a composition of matter comprising zinc-indium-oxide wherein indium is 40–75 atomic % of the metal elements. The composition is useful as a transparent conductive material, especially in devices comprising a layer of the material disposed on a substrate such as a transparent substrate of glass, plastic or semiconductor. The material is advantageously doped with an aliovalent material having a valence different from either zinc (+2) or indium (+3). Preferably the doping material is a tetravalent material. Compositions and devices employing the new material can be advantageously aliovalently doped to resistivities less than 1 milliohm-cm. It is possible to substitute a material M having a valence greater than 3 for the indium to produce $Zn_x(In_{2-y}M_y)_z$ oxide where 2z is 40–75 atomic % of the metal elements and $0.005 \leq y \leq 0.4$. It is also possible to substitute a material M having a valence greater than 2 for the zinc to produce $Zn_{1-w}M_wIn_y$ oxide where y is 40–75 atomic % of the metal elements and $0.005 \leq w \leq 0.4$. In addition, one can simultaneously substitute for Zn a material M having a valence greater than 2 and for In a material M' having a valence greater than 3 to produce $Zn_{x-w}M_w(In_{2-y}M'_y)$ oxide where 2/(x+2) is 40–75 atomic % of the metal elements. In a series of experiments using zinc-indium-oxide ceramic samples prepared as described below, it was determined that films prepared from ceramic targets with composition $Zn_{2.5}In_{2-x}Sn_xO_y$ with $0.1 \leq x \leq 0.3$ had optimal properties. It was further determined that a target of $Zn_{2.5}In_{1.7}Sn_{0.3}O_y$ yielded a film 0.5 micrometer thick with composition $Zn_{1.4}In_{1.7}Sn_{0.3}O_y$. Methods for preparing conductively doped zinc-indium-oxide can be understood by consideration of the following examples.

Example 1

Powdered zinc oxide, ZnO, indium oxide, $In_2O_3$, and tin oxide, $SnO_2$, are weighed out to yield the appropriate mole ratios for $Zn_{2.5}In_{2-x}Sn_xO_y$, $0 \leq x \leq 0.3$. For instance, for a 5-gram total weight sample of $Zn_{2.5}In_{1.7}Sn_3O_y$, 2.0899 grams of ZnO, 2.4348 grams of $In_2O_3$ and 0.4664 grams of $SnO_2$ are used. The powders are mixed together and ground together in a mechanical mortar and pestle for a minimum of five minutes to insure good mixing and contact of powder particles. The mixed powders are transferred into high density aluminum oxide crucibles with cover and heated in air for an initial period of 12–15 hours at 1100° C. The resulting powders are then ground mechanically again, re-introduced into the covered aluminum oxide crucibles, and heated for a period of 12–15 hours at 1200° C. in air. After a third grinding, pellets are pressed in a standard steel dye (typically to a load of 3000 pounds for a half-inch diameter pellet). The pellets are then heated at 1300° C. in air for a period of up to 16 hours. Pellets are typically buried in powder of their own composition inside the covered aluminum oxide crucibles for the pellet firing step. The pellets are cooled after this heating step at the natural cooling rate of the furnace, which in our case results in reaching 300° C. in approximately three hours, at which point the pellets are removed from the furnace. Air is selected as an ambient for the initial processing steps because of its convenience. Covers are placed over the crucibles as a precaution to prevent evaporation of the oxides, but we have not observed evaporation under the conditions described. The times of these treatments are expected to be dependent on the reactivities of the starting materials and the efficiencies of the grinding operations. Shorter times can be expected to give equally satisfactory results, for example, in the preparation of ceramic targets for sputtering or laser ablation.

The bulk material after air firing is not in its optimally conducting state. A further treatment is advantageous to improve the conductivity. In this treatment, a heating of duration 10–12 hours in flowing $N_2$ (approximately 100 cc/min, $N_2$ typically approximately 50–100 ppm $O_2$) in a ceramic tube furnace at 1200° C. is employed, again with the pellets allowed to cool at the natural furnace cooling rate. Covered aluminum oxide crucibles and a powder bed for the pellets need not necessarily be employed for this step. The pellets emerge from the $N_2$ treatment with good electrical conductivity.

Example 2

Processing conditions are as described in Example 1 except that after firing in air the pellets are heated in a nitrogen-hydrogen (15 mole percent hydrogen) ambient rather than in $N_2$, and at a temperature of 400° C. rather than 1200° C., for a period of one hour.

Example 3

Processing conditions as described in Examples 1 and 2, with ZnO, $Al_2O_3$, and $In_2O_3$ in appropriate mole ratios to yield $Zn_{2.5-x}Al_xIn_2O_y$. For example for $Zn_{2.3}Al_{0.2}In_2O_y$ in an 8 gram batch, 3.1521 grams of ZnO, 0.1717 grams of $Al_2O_3$ and 4.6762 grams of $In_2O_3$ are employed.

Example 4

Processing conditions as described in Examples 1 and 2, with ZnO, $Ga_2O_3$ and $In_2O_3$ mixed in appropriate mole ratios to yield $Zn_{2.5-x}Ga_xIn_2O_y$. For example for $Zn_{2.3}Ga_{0.2}In_2O_y$ in an 8 gram batch, 3.0964 grams of ZnO, 0.3101 grams of $Ga_2O_3$ and 4.5935 grams of $In_2O_3$ are employed.

Example 5

Processing as described in examples 1 and 2 with ZnO, $GeO_2$ and $In_2O_3$ mixed in the appropriate mole ratios to yield $Zn_{2.5-x}Ge_xIn_2O_y$. For example for $Zn_{2.3}Ge_{0.2}In_2O_y$ in an 8 gram batch, 3.0825 grams of ZnO, 0.3445 grams of $GeO_2$, and 4.5729 grams of $In_2O_3$ are employed.

It is contemplated that a basic use of zinc-indium-oxide is to provide transparent coatings on substrates such as glass, semiconductor or plastic. For example, the ability of the material to transmit light of any wavelength from 0.45 μm to 1.5 μm makes it useful as a coating material for windows, solar cells or display devices. Such coated substrates permit selective entry of visible and infrared light while reflecting ultraviolet. FIG. 1 is a schematic cross section of a substrate 30, such as a transparent glass, coated with a thin layer 31 comprising conductively doped zinc-indium-oxide. Preferably the coating is in the form of a thin continuous amorphous or polycrystalline layer having a thickness typically in the range 0.1 μm to 1 μm. The method for coating a substrate 30 can be understood by considering the following examples.

Example 6 (Deposition By Laser Ablation)

Figure 2:
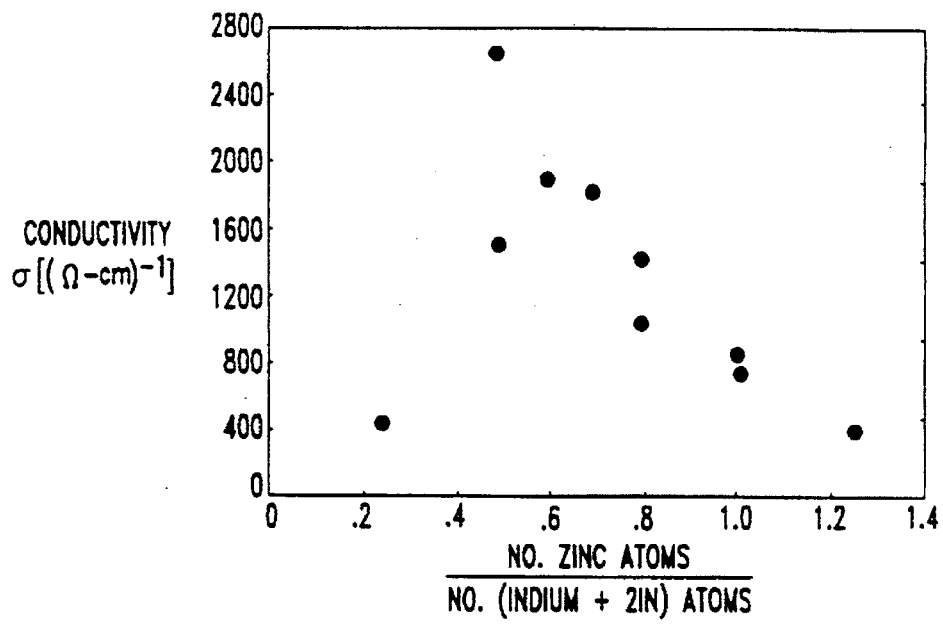
FIG. 2 is a diagram showing the conductivity of several different tin-doped zinc-indium-oxide films deposited by pulsed laser deposition and dc magnetron sputter deposition.

A pressed pellet of $Zn_{2.5}In_{1.7}Sn_{0.3}O_x$ was placed in the target holder of a pulsed laser deposition vacuum chamber and a vitreous quartz substrate was mounted onto a heatable substrate holder facing the target and positioned about 8 cm from the target. The chamber was evacuated to a base pressure of $1-10\times10^{-7}$ Torr and 1 mTorr of oxygen was bled into the chamber. The substrate was heated to 250° C., and then the target was bombarded by pulses from a KrF excimer laser operating at 248 nm with a pulse repetition rate at 10 Hz. The energy density of the laser on target was 1–4 J/cm². The deposition rate was 1000–2000 angstroms per hour. After growth of several thousand angstroms, the chamber was again evacuated and the substrate was permitted to cool to room temperature. The films subsequently removed from the chamber were transparent to the eye with good electrical conductivity, i.e., resistivity as low as 500 μΩ-cm. Film composition as determined by Rutherford backscattering was $Zn_{0.7}(In_{1.7}Sn_{0.3})_{0.5}O_y$. FIG. 2 is a diagram showing conductivities of several different tin doped zinc-indium-oxide films deposited by pulsed laser deposition and by sputtering. In the figure the abcissa is the ratio in the film of zinc content to (In+Sn) content.

Example 7 (Deposition By Sputtering)

A pressed pellet of zinc-indium-oxide doped with tin $Zn_{2.5}In_{1.7}Sn_{0.3}O_x$ was placed in the target holder of a dc magnetron sputter deposition chamber. Corning glass and vitreous quartz substrates were placed in proximity to the target in two configurations: (1) on-axis geometry directly underneath the target and (2) off-axis geometry outside the plasma plume, approximately 0.5–2.0 cm from the edge of the sputtering gun. The chamber was evacuated, and a sputtering gas consisting of an argon-oxygen mixture (15-1 ratio) at 4–20 mTorr was introduced. The substrate was heated to 250° C.–500° C. The film composition was $Zn_1In_{1.7}Sn_{0.3}O_x$ at 350° C. and $Zn_{1.2}In_{1.7}Sn_{0.3}O_x$ at 450° C. The target was then impacted by the sputter gun (a US 1" magnetron source) operating at a dc voltage of 350 V, a current of 0.78 A, and a power level of 25 Watts. The growth rate was about 1.3 μm per hour in the on-axis geometry and 0.25 to 0.5 μm per hour in the off-axis geometry. Film resistivity as low as 380 μΩ-cm was obtained for a film deposited at 450° C.

Figure 3:
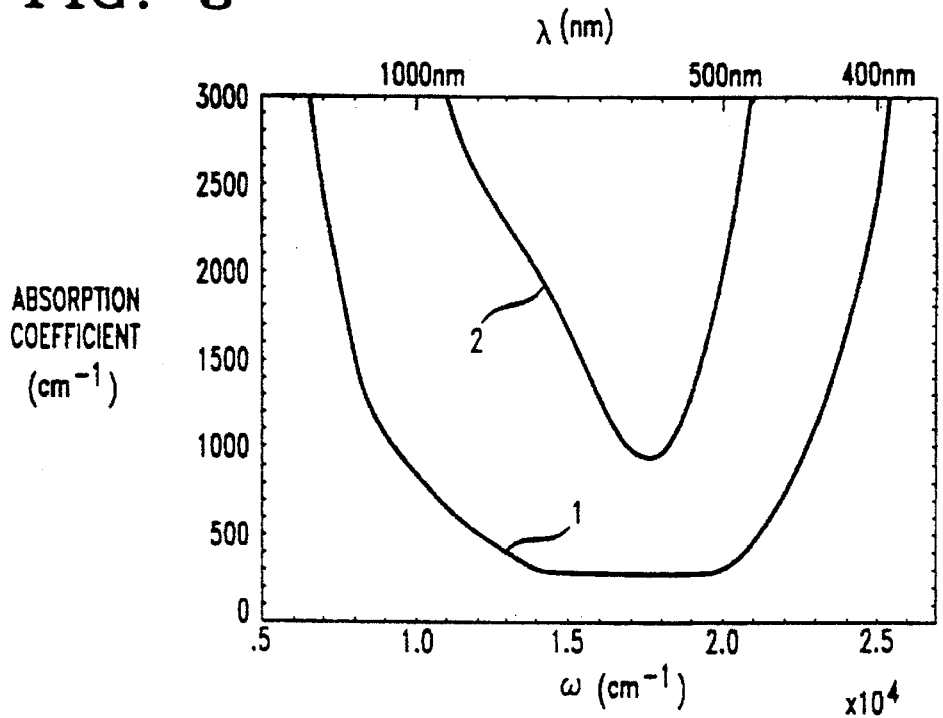
FIG. 3 is a graphical display of absorption versus wavelength for conductively doped zinc-indium-oxide in comparison with conventional indium tin oxide (ITO).

FIG. 3 is a graphical illustration of the absorption spectrum of conductively doped zinc-indium-oxide (curve 1) in comparison with that of conventional ITO (curve 2). As can be seen, the zinc-indium-oxide film exhibits uniformly small absorption across the visible spectrum (from about 400 to 700 nm).

Figure 4:
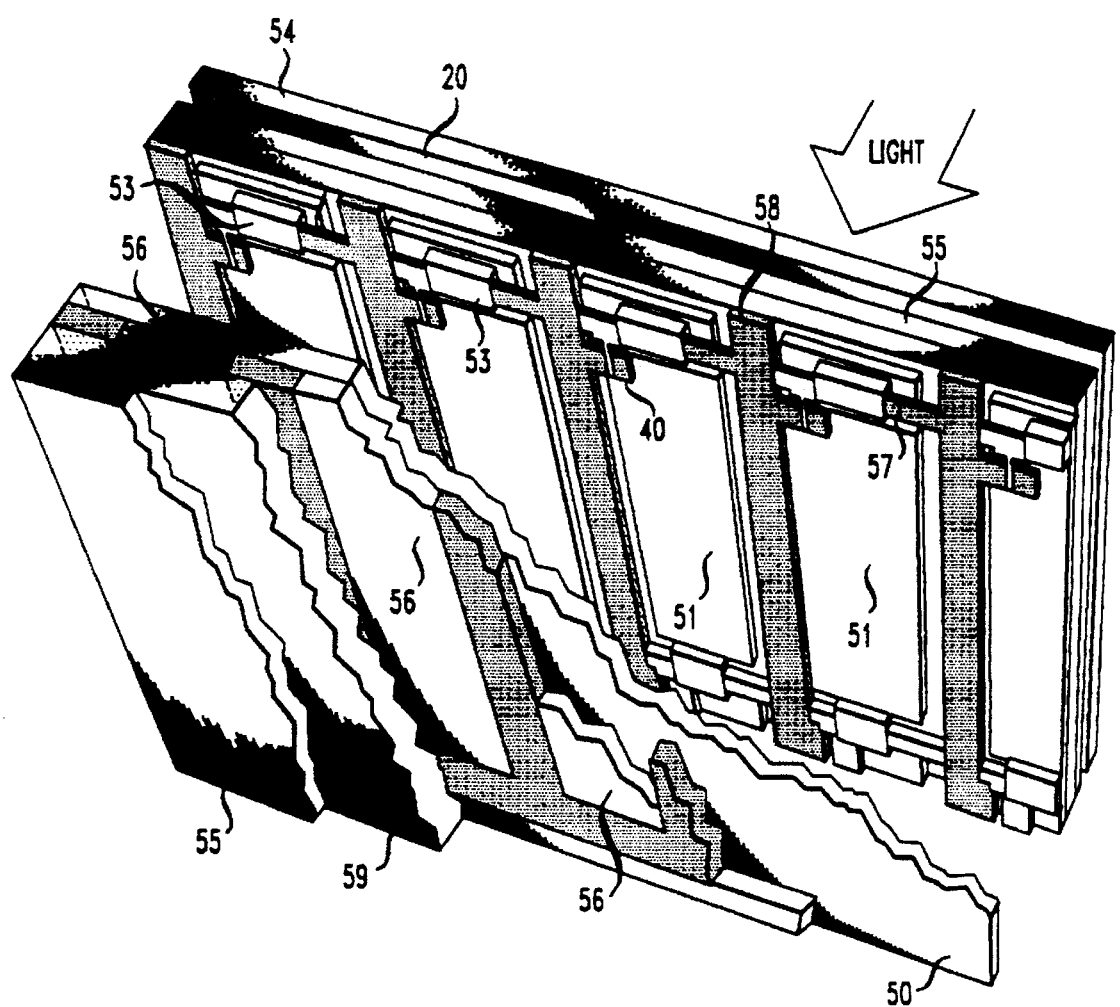
FIG. 4 shows the use of conductively doped zinc-indium-oxide electrodes in a liquid crystal display device.

One important use of zinc-indium-oxide coated substrates is in flat panel display devices using transparent electrodes such as liquid crystal displays. Electrodes comprising zinc-indium-oxide can provide enhanced transparency, particularly in the visible blue region. FIG. 4, which is a schematic rendering of a portion of an active matrix liquid crystal display device (AMLCD), shows how the product of FIG. 1 can be used to make an improved flat panel display. In essence the AMLCD comprises a liquid crystal medium (not shown) disposed between a transparent common electrode 50 and an array of transistors 51 and a local electrodes 52 (preferably pixel-size) disposed on a common substrate 30. Each local electrode is switched by an associated transistor 51 interconnected to an associated storage capacitor 53. The transistors 51 thereby control the state of the voltage on each local electrode 52 and, in accordance with well known principles, control the optical state of a pixel-size liquid crystal region.

In accordance with conventional structure, the AMLCD includes a back light (not shown), a diffuser 54, polarizers 55 and a grid of color filter layers 56 disposed on a transparent substrate 59. Rows of transistor gates can be interconnected via conductive gate lines 57 and columns of transistor sources can be interconnected via conductive data lines 58 for switchable control of individual pixels.

The AMLCD of FIG. 4 is of conventional construction except that the transparent electrodes comprise zinc-indium-oxide coated on glass substrates as shown in FIG. 1. The material is preferably conductively doped with an aliovalent dopant. The advantage of using the inventive transparent conducting material in this AMLCD include greater conductivity, enhanced transparency and more realistic color display, especially in the blue portion of the visible spectrum. While zinc-indium-oxide is the preferred composition for the transparent electrodes, any of the new conductively doped compositions disclosed herein can be used with similar advantages. Moreover, while liquid crystal displays have been described, the conductively doped compositions can be used as transparent electrodes on other types of flat panel displays such as electron emission displays.

It is to be understood that the above-described embodiments are illustrative of only a few of the many possible specific embodiments of the invention. Numerous and varied other arrangements can be made by those skilled in the art without departing from the spirit and scope of the invention.

We claim:

1. A transparent conductive material comprising zinc-indium-oxide wherein indium is 40–75 atomic % of the metal elements, said material having an absorption which is less than that of indium tin oxide over a spectral range that includes the range from 500 nm to 900 nm.

2. The transparent conductive material of claim 1 doped with an aliovalent material.

3. The transparent conductive material of claim 2 wherein said aliovalent material is a tetravalent material.

4. The transparent conductive material of claim 1 doped with an aliovalent material to a resistivity less than 1 milliohm-cm.

5. The material of claim 4 wherein said aliovalent material is a tetravalent material.

6. A transparent conductive material of claim 1 comprising $Zn_x(In_{2-y}M_y)_z$ oxide where M is a material with a valence greater than 3, 2z is 40–75 atomic % of the metal elements and $0.005 \leq y \leq 0.4$.

7. The material of claim 6 wherein M is a tetravalent material.

8. The transparent conductive of claim 7 where M is Sn.

9. The transparent conductive material of claim 1 comprising $Zn_{1-w}M_wIn_y$ oxide where M is a material having a valence greater than 2, where y is 40–75 atomic % of the metal elements and $0.005 \leq w \leq 0.4$.

10. The material of claim 9 where M is Al, Ga or Ge.

11. The transparent conductive material of claim 1 comprising $Zn_{x-w}M_w(In_{2-y}M'_y)$ oxide where M is a material having a valence greater than 2 and M' is a material having a valence greater than 3 and wherein 2/x+2 is 40–75%, said material having an absorption which is less than that of indium tin oxide over a spectral range that includes the range from 500 nm to 900 nm.

\* \* \* \* \*